Aug. 17, 1926.

B. M. H. PRESTON 1,596,373

WIND WHEEL

Filed Nov. 10, 1925    2 Sheets-Sheet 1

Inventor
B. M. H. Preston
By Watson E. Coleman
Attorney

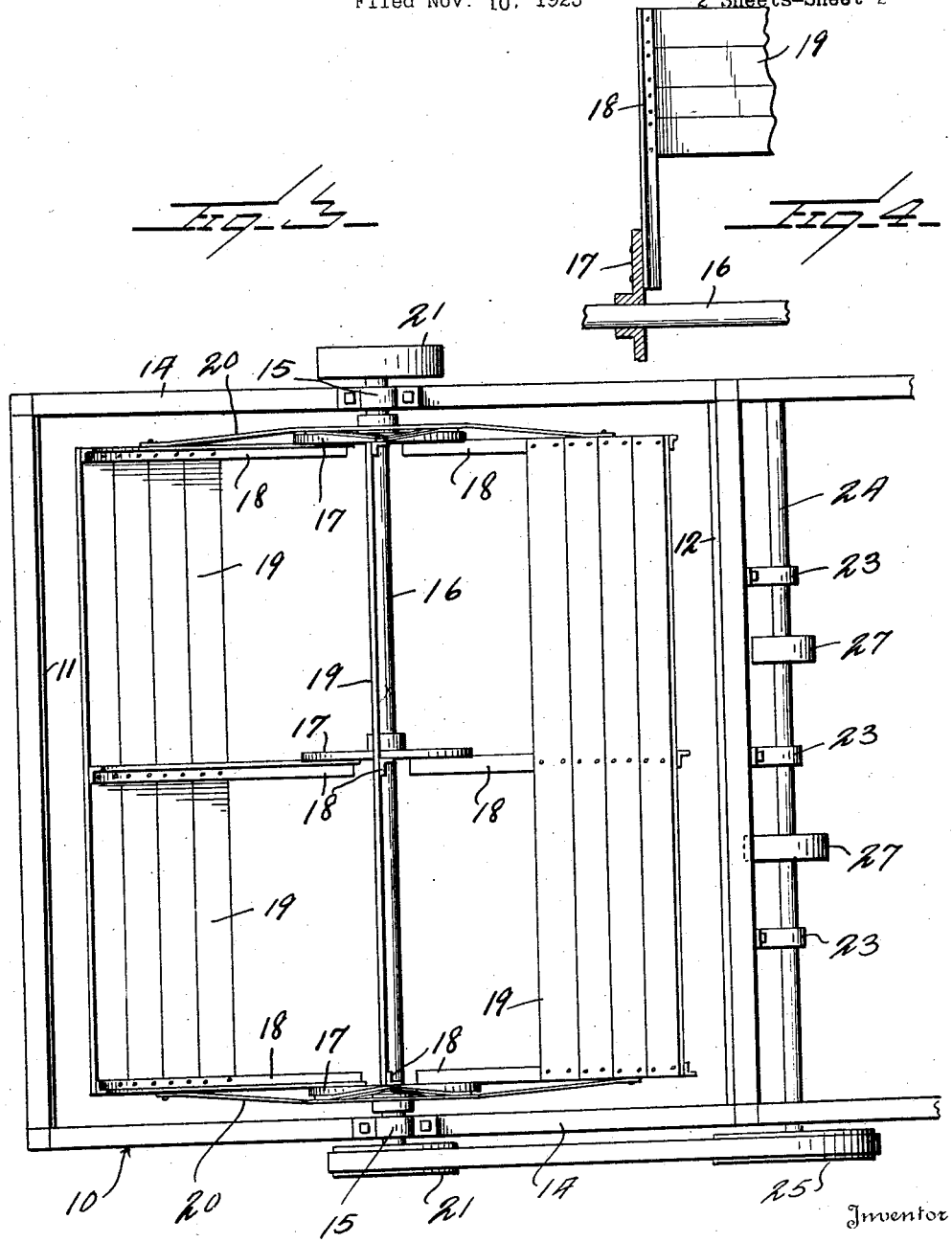

Patented Aug. 17, 1926.

1,596,373

UNITED STATES PATENT OFFICE.

BENJAMIN M. H. PRESTON, OF BAKER, OREGON.

WIND WHEEL.

Application filed November 10, 1925. Serial No. 68,171.

This invention relates to wind wheels and has for an important object thereof the provision of a wheel arranged to derive power from the wind and connected to drive machinery, pumps or the like.

An important object of the invention is to provide a device of this character which will provide a great amount of power and which, at the same time, may be very durably and cheaply constructed.

The invention further resides in the construction and arrangement of the several parts hereinafter set forth and as more particularly shown in the accompanying drawings, wherein:—

Figure 3 is a plan view thereof, a portion of the shed roofing being removed;

Figure 4 is an enlarged detail sectional view showing the manner of attaching the vanes to the flanges.

Figure 1:
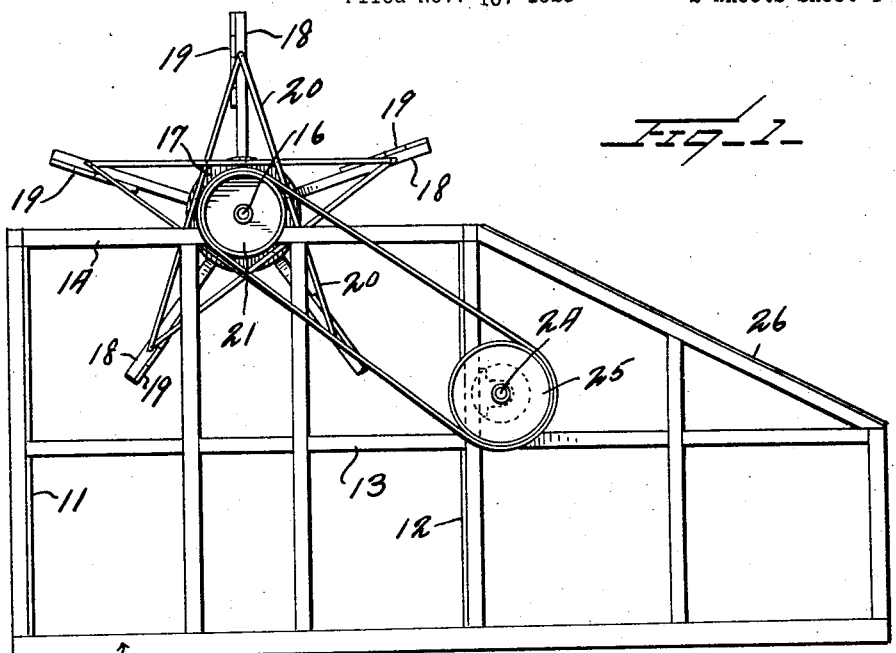
Figure 1 is a side elevation of a wind power constructed in accordance with my invention.
Figure 2:
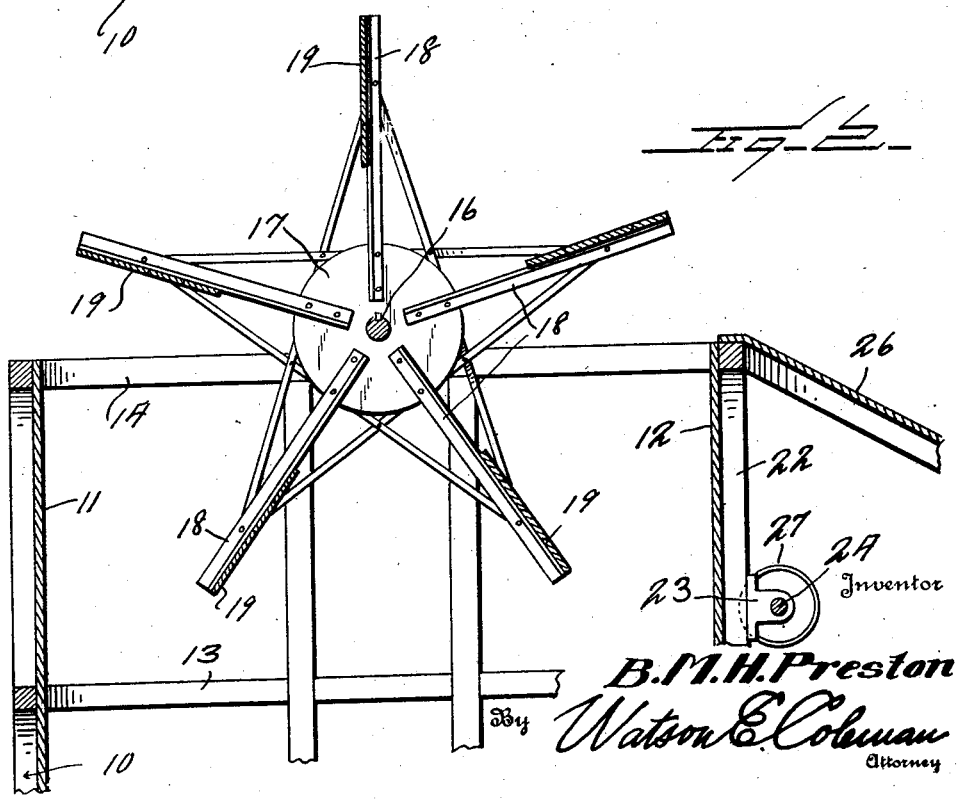
Figure 2 is a vertical sectional view therethrough.

Referring now more particularly to the drawings, the numeral 10 generally designates a structure including spaced parallel walls 11 and 12 suitably connected at their ends by framework end members 13, each including an upper frame member 14. These frame members 14 have mounted upon the upper surfaces thereof at their centers bearings 15 for the reception of the shaft 16 of a wind wheel.

Secured to this shaft intermediate the bearings 15 are three flanges 17 to each of which is secured a plurality of radially extending angle iron bars 18. Each angle iron bar 18 has one flange thereof secured to the associated shaft flange and the other flange thereof adjacent its outer end forms a means for attaching the arm to wooden framing members 19 forming a vane of the wind wheel. It will, of course, be understood that the arms 18 of the flanges 17 correspond in number and arrangement and that the framing members of each vane are secured to an arm of each of the flanges. The arms are preferably five in number and each arm has secured thereto at opposite sides thereof strap iron braces 20, the opposite end of which is connected to a second arm and the central portion of which is connected to the associated flange 17.

It will be obvious that by the structure and mounting above set forth, one-half of the wheel structure will project above the walls 11 and 12 and be subjected to the action of passing winds while the vanes during their return travel are protected against the action of the wind by either the wall 11 or 12.

The ends of the shaft 16 project beyond the end frame member 13 and have secured thereto pulleys 21. To the framing members 22 of the wall 12 are secured a plurality of horizontally aligned bearings 23 receiving a shaft 24 having a pulley 25 aligning with one of the pulleys 24 and connected therewith by a belt. From the upper edge of the wall 12, a suitably supported roof structure 26 is extended outwardly and downwardly to provide a housing for the shaft 24 and for machinery which is to be operated from pulleys 27 mounted upon this shaft.

It will be obvious that a device of this character may be very readily erected and will provide a powerful and practically constant supply of power, it being usual in many portions of the country for the wind to blow during the major portion of the time either in one direction or in an opposite direction thereto so that it is unnecessary that this structure be mounted upon a turntable for facing it into the wind. It will, of course, be obvious that the wheel will be operated by any wind other than a wind directly transverse to the shaft 16.

Since the structure hereinbefore set forth is obviously capable of a certain range of change and modification without materially departing from the spirit of the invention, I do not limit myself to such specific structure except as hereinafter claimed.

I claim:—

A wind wheel comprising a shaft, a plurality of flanges mounted upon the shaft, a plurality of angle iron arms extending radially from each shaft and each having one flange thereof secured to the associated shaft flange, the arms of said flanges corresponding in number and arrangement, longitudinally extending vane elements secured to the remaining flanges of corresponding arms and brace elements connecting each of said arms with a second arm of the associated flange, said braces being connected at their middles to the associated flange.

In testimony whereof I hereunto affix my signature.

BENJAMIN M. H PRESTON.